US007669107B2

(12) United States Patent
Forhan et al.

(10) Patent No.: US 7,669,107 B2
(45) Date of Patent: Feb. 23, 2010

(54) METHOD AND SYSTEM FOR INCREASING PARALLELISM OF DISK ACCESSES WHEN RESTORING DATA IN A DISK ARRAY SYSTEM

(75) Inventors: Carl Edward Forhan, Rochester, MN (US); Robert Edward Galbraith, Rochester, MN (US); Adrian Cuenin Gerhard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/923,280

(22) Filed: Oct. 24, 2007

(65) Prior Publication Data

US 2008/0046648 A1 Feb. 21, 2008

Related U.S. Application Data

(62) Division of application No. 10/994,098, filed on Nov. 19, 2004.

(51) Int. Cl.
*G11C 29/00* (2006.01)

(52) U.S. Cl. ............... 714/763; 714/768; 714/770

(58) Field of Classification Search ........... 724/763, 724/770, 768, 773, 775, 6, 5
See application file for complete search history.

(56) References Cited

U.S. PATENT DOCUMENTS

| | | | |
|---|---|---|---|
| 3,688,265 A | 8/1972 | Carter et al. | |
| 5,134,619 A | 7/1992 | Henson et al. | |
| 5,140,592 A | 8/1992 | Idleman et al. | |
| RE34,100 E | 10/1992 | Hartness | |
| 5,274,645 A | 12/1993 | Idleman et al. | |
| 5,285,451 A | 2/1994 | Henson et al. | |
| 5,390,187 A | 2/1995 | Stallmo | |
| 5,448,719 A * | 9/1995 | Schultz et al. | 714/5 |
| 5,488,731 A | 1/1996 | Mendelsohn | |
| 5,499,253 A | 3/1996 | Lary | |
| 5,530,948 A | 6/1996 | Islam | |

(Continued)

OTHER PUBLICATIONS

IBM Technical Disclosure Bulletin, vol. 38, No. 07, Jul. 1995, pp. 455-458, "Foreground/Background Checking of Parity in a Redundant Array of Independent Disks-5 Storage Subsystem" by Faunce, M.S. et al.

(Continued)

*Primary Examiner*—Scott T Baderman
*Assistant Examiner*—Fritz Alphonse
(74) *Attorney, Agent, or Firm*—Wood, Herron & Evans, LLP

(57) ABSTRACT

In a disk array environment such as a Redundant Array of Independent Disks-6 (RAID-6) environment, the overall performance overhead associated with exposed mode operations such as resynchronization, rebuild and exposed mode read operations is reduced through increased parallelism. By selecting only subsets of the possible disks required to solve a parity stripe equation for a particular parity stripe, accesses to one or more disks in a disk array may be omitted, thus freeing the omitted disks to perform other disk accesses. In addition, disk accesses associated with different parity stripes may be overlapped such that the retrieval of data necessary for restoring data for one parity stripe is performed concurrently with the storage of restored data for another parity stripe.

16 Claims, 3 Drawing Sheets

U.S. PATENT DOCUMENTS

| | | | |
|---|---|---|---|
| 5,537,534 A * | 7/1996 | Voigt et al. .................... | 714/6 |
| 5,537,567 A * | 7/1996 | Galbraith et al. ............ | 711/114 |
| 5,617,530 A * | 4/1997 | Stallmo et al. ................ | 714/6 |
| 5,673,412 A | 9/1997 | Kamo et al. | |
| 5,720,025 A * | 2/1998 | Wilkes et al. ................. | 714/6 |
| 5,754,563 A | 5/1998 | White | |
| 5,911,779 A * | 6/1999 | Stallmo et al. ................ | 714/6 |
| 5,948,110 A | 9/1999 | Hitz et al. | |
| 5,956,524 A | 9/1999 | Gajjar et al. | |
| 6,092,215 A | 7/2000 | Hodges et al. | |
| 6,101,615 A | 8/2000 | Lyons | |
| 6,279,050 B1 | 8/2001 | Chilton et al. | |
| 6,408,400 B2 | 6/2002 | Taketa et al. | |
| 6,480,944 B2 | 11/2002 | Bradshaw et al. | |
| 6,567,891 B2 | 5/2003 | Oldfield et al. | |
| 6,570,839 B2 | 5/2003 | Kimura et al. | |
| 6,687,872 B2 | 2/2004 | Oldfield et al. | |
| 6,836,820 B1 | 12/2004 | Viswanathan et al. | |
| 6,918,007 B2 | 7/2005 | Chang et al. | |
| 6,944,791 B2 | 9/2005 | Humlicek et al. | |
| 7,028,136 B1 | 4/2006 | Priyadarshan et al. | |
| 7,065,609 B2 | 6/2006 | Eatherton et al. | |
| 7,082,492 B2 | 7/2006 | Pullela et al. | |
| 7,111,227 B2 | 9/2006 | Oldfield et al. | |
| 7,206,946 B2 | 4/2007 | Sakakibara et al. | |
| 7,426,611 B1 | 9/2008 | Gupta et al. | |
| 2002/0166078 A1 | 11/2002 | Oldfield et al. | |
| 2002/0194427 A1 * | 12/2002 | Hashemi ..................... | 711/114 |
| 2004/0049632 A1 | 3/2004 | Chang et al. | |
| 2005/0108613 A1 | 5/2005 | Kobayashi | |

OTHER PUBLICATIONS

M.H. Jing et al., "A fast error and erasure correction algorithm for a simple RS-RAID", IEEE 2001, Oct. 29-Nov. 1, 2001, pp. 333-338.

Stephen B. Wicker, Error control Systems for Digital Communications, Prentice-Hall, 1995, pp. 204-211.

U.S. Patent and Trademark Office, Notice of Allowance issued in related U.S. Appl. No. 10/994,098, dated May 5, 2009.

U.S. Patent and Trademark Office, Final Office Action issued in related U.S. Appl. No. 10/994,098, dated Nov. 12, 2008.

U.S. Patent and Trademark Office, Office Acton issued in related U.S. Appl. No. 10/994,098, dated Jul. 10, 2008.

U.S. Patent and Trademark Office, Office Action issued in related U.S. Appl. No. 10/994,098, dated Jan. 2, 2008.

U.S. Patent and Trademark Office, Office Action issued in related U.S. Appl. No. 10/994,098, dated Sep. 25, 2007.

* cited by examiner

METHOD AND SYSTEM FOR INCREASING PARALLELISM OF DISK ACCESSES WHEN RESTORING DATA IN A DISK ARRAY SYSTEM

CROSS-REFERENCE TO RELATED APPLICATIONS

This application is a divisional of U.S. patent application Ser. No. 10/994,098 filed on Nov. 19, 2004 by Carl Edward Forhan, Robert Edward Galbraith and Adrian Cuenin Gerhard.

Furthermore, this application is related to U.S. application Ser. No. 10/994,088, entitled "METHOD AND SYSTEM FOR ENHANCED ERROR IDENTIFICATION WITH DISK ARRAY PARITY CHECKING", Ser. No. 10/994,099, entitled "RAID ENVIRONMENT INCORPORATING HARDWARE-BASED FINITE FIELD MULTIPLIER FOR ON-THE-FLY XOR", Ser. No. 10/994,086, entitled "METHOD AND SYSTEM FOR IMPROVED BUFFER UTILIZATION FOR DISK ARRAY PARITY UPDATES", Ser. No. 10/994,097, entitled "METHOD AND SYSTEM FOR RECOVERING FROM ABNORMAL INTERRUPTION OF A PARITY UPDATE OPERATION IN A DISK ARRAY SYSTEM", all filed on Nov. 19, 2004 by Carl Edward Forhan et al., as well as to U.S. application Ser. No. 11/867,407 filed on Oct. 4, 2007 by Carl Edward Forhan et al., which is a divisional application of the above-listed U.S. application Ser. No. 10/994,086; and to application Ser. Nos. 11/873,085, 11/873,086, 11/873,087, and 11/873,088, all of which are divisional applications of the above-listed U.S. application Ser. No. 10/994,098 and all filed on Oct. 16, 2007 by Carl Edward Forhan et al. Each of these applications is incorporated by reference herein in its entirety.

FIELD OF THE INVENTION

The present invention relates to data protection methods for data storage and, more particularly, to systems implementing RAID-6 and similar data protection and recovery strategies.

BACKGROUND OF THE INVENTION

RAID stands for Redundant Array of Independent Disks and is a taxonomy of redundant disk array storage schemes which define a number of ways of configuring and using multiple computer disk drives to achieve varying levels of availability, performance, capacity and cost while appearing to the software application as a single large capacity drive. Typical RAID storage subsystems can be implemented in either hardware or software. In the former instance, the RAID algorithms are packaged into separate controller hardware coupled to the computer input/output ("I/O") bus and, although adding little or no central processing unit ("CPU") overhead, the additional hardware required nevertheless adds to the overall system cost. On the other hand, software implementations incorporate the RAID algorithms into system software executed by the main processor together with the operating system, obviating the need and cost of a separate hardware controller, yet adding to CPU overhead.

Various RAID levels have been defined from RAID-0 to RAID-6, each offering tradeoffs in the previously mentioned factors. RAID-0 is nothing more than traditional striping in which user data is broken into chunks which are stored onto the stripe set by being spread across multiple disks with no data redundancy. RAID-1 is equivalent to conventional "shadowing" or "mirroring" techniques and is the simplest method of achieving data redundancy by having, for each disk, another containing the same data and writing to both disks simultaneously. The combination of RAID-0 and RAID-1 is typically referred to as RAID-0+1 and is implemented by striping shadow sets resulting in the relative performance advantages of both RAID levels. RAID-2, which utilizes Hamming Code written across the members of the RAID set is not now considered to be of significant importance.

In RAID-3, data is striped across a set of disks with the addition of a separate dedicated drive to hold parity data. The parity data is calculated dynamically as user data is written to the other disks to allow reconstruction of the original user data if a drive fails without requiring replication of the data bit-for-bit. Error detection and correction codes ("ECC") such as Exclusive-OR ("XOR") or more sophisticated Reed-Solomon techniques may be used to perform the necessary mathematical calculations on the binary data to produce the parity information in RAID-3 and higher level implementations. While parity allows the reconstruction of the user data in the event of a drive failure, the speed of such reconstruction is a function of system workload and the particular algorithm used.

As with RAID-3, the RAID scheme known as RAID-4 consists of N data disks and one parity disk wherein the parity disk sectors contain the bitwise XOR of the corresponding sectors on each data disk. This allows the contents of the data in the RAID set to survive the failure of any one disk. RAID-5 is a modification of RAID-4 which stripes the parity across all of the disks in the array in order to statistically equalize the load on the disks.

The designation of RAID-6 has been used colloquially to describe RAID schemes that can withstand the failure of two disks without losing data through the use of two parity drives (commonly referred to as the "P" and "Q" drives) for redundancy and sophisticated ECC techniques. Although the term "parity" is used to describe the codes used in RAID-6 technologies, the codes are more correctly a type of ECC code rather than simply a parity code. Data and ECC information are striped across all members of the RAID set and write performance is generally lower than with RAID-5 because three separate drives must each be accessed twice during writes. However, the principles of RAID-6 may be used to recover a number of drive failures depending on the number of "parity" drives that are used.

Some RAID-6 implementations are based upon Reed-Solomon algorithms, which depend on Galois Field arithmetic. A complete explanation of Galois Field arithmetic and the mathematics behind RAID-6 can be found in a variety of sources and, therefore, only a brief overview is provided below as background. The Galois Field arithmetic used in these RAID-6 implementations takes place in $GF(2^N)$. This is the field of polynomials with coefficients in $GF(2)$, modulo some generator polynomial of degree N. All the polynomials in this field are of degree N-1 or less, and their coefficients are all either 0 or 1, which means they can be represented by a vector of N coefficients all in $\{0,1\}$; that is, these polynomials "look" just like N-bit binary numbers. Polynomial addition in this Field is simply N-bit XOR, which has the property that every element of the Field is its own additive inverse, so addition and subtraction are the same operation. Polynomial multiplication in this Field, however, can be performed with table lookup techniques based upon logarithms or with simple combinational logic.

Each RAID-6 check code (i.e., P and Q) expresses an invariant relationship, or equation, between the data on the data disks of the RAID-6 array and the data on one or both of the check disks. If there are C check codes and a set of F disks fail, $F \leq C$, the failed disks can be reconstructed by selecting F of these equations and solving them simultaneously in $GF(2^N)$ for the F missing variables. In the RAID-6 systems implemented or contemplated today there are only 2 check disks—check disk P, and check disk Q. It is worth noting that the check disks P and Q change for each stripe of data and parity across the array such that parity data is not written to a dedicated disk but is, instead, striped across all the disks.

Even though RAID-6 has been implemented with varying degrees of success in different ways in different systems, there remains an ongoing need to improve the efficiency and costs of providing RAID-6 protection for data storage. The mathematics of implementing RAID-6 involve complicated calculations that are also repetitive. Accordingly, efforts to improve the simplicity of circuitry, the cost of circuitry and the efficiency of the circuitry needed to implement RAID-6 remains a priority today and in the future.

For example, one limitation of existing RAID-6 designs relates to the performance overhead associated with performing resync (where parity data for a parity stripe is resynchronized with the current data), rebuild (where data from a faulty or missing drive is regenerated based upon the parity data) or other exposed mode operations such as exposed mode reads. A resync operation, for example, requires that, for each parity stripe defined in the disk array, the data must be read from all of the disks and used to solve a parity stripe equation by multiplying the data from each disk by an appropriate value and XOR'ing the multiplied data like a sum of products to construct a parity value for the parity stripe. In addition, the parity value calculated as the result of solving the parity stripe equation must be written to the appropriate disk. In addition, since RAID-6 designs rely on two parity values for each parity stripe, the aforementioned process typically must be performed twice for each parity stripe to generate and write both parity values to the disk array.

Likewise, to rebuild an exposed disk, data for each parity stripe must be read from all of the other disks and used to solve a parity stripe equation in a similar multiply-and-XOR manner as is used for resynchronization. The result of solving the parity stripe equation is the data that is written back to the exposed disk. In addition, for other exposed mode operations such as exposed mode read operations, a similar process to a rebuild operation must be performed, albeit without storing back the result of the parity stripe equation to the disk array.

In each of these exposed mode operations, however, the requirements of reading data from certain disks and writing data back to certain disks results in substantial performance overhead, specifically with respect to the sequential nature of the various disk access operations on the disk array. A substantial need therefore exists for a manner of improving the performance of a disk array system such as a RAID-6 system to improve performance in connection with resynchronization, rebuild and other exposed mode operations.

SUMMARY OF THE INVENTION

The invention addresses these and other problems associated with the prior art through a number of techniques that individual or collectively increase parallelism in terms of accessing the disks in a disk array, and thereby reduce the performance overhead associated with exposed mode operations such as resynchronization, rebuild and exposed mode read operations.

In one aspect, for example, accesses to disks in a disk array for the purpose of solving a parity stripe equation (e.g., in connection with a rebuild, exposed mode read or other exposed mode operation) may be optimized by selecting only a subset of the possible disks required to solve the parity stripe equation, and thus omitting accesses to one or more disks. By doing so, utilization of the disks in a disk array typically may be better balanced when a number of such operations are performed over a particular time period, so long as different subsets of disks are selected for different operations.

While other disk array environments may be used, when implemented in a RAID-6 environment, where the data in a parity stripe equation is related via two parity stripe equations, each subset of data may comprise N-2 disks among the N disks in a disk array. Moreover, while other manners of selecting subsets of disks may be used, in one embodiment a random selection mechanism may be used such that certain disks are randomly omitted.

Consistent with this aspect of the invention, a disk array of N disks may be accessed such that, for each of a plurality of parity stripes defined in the disk array, a different subset of disks among the N disks to be used to solve a parity stripe equation for such parity stripe is selected. Retrieval of data associated with each parity stripe may then be initiated only from the selected subset of disks for that parity stripe, with such retrieved data used to solve the parity stripe equation for that parity stripe. In addition, each selected subset of disks includes at most N-2 disks.

In another aspect, parallelism may be increased in a disk array system by overlapping disk accesses associated with different parity stripes when restoring data in a disk array (e.g., to resynchronize parity and data, or to rebuild data for an exposed disk). Specifically, consistent with this aspect of the invention, restoring data to a disk array may include the retrieval of a first set of data associated with a first parity stripe, coupled with concurrent operations of writing to the disk array a result value generated by processing the first set of data, and reading from the disk array a second set of data associated with a second parity stripe. By overlapping read and write accesses associated with different parity stripes, data associated with multiple parity stripes may be restored with less overhead than if the accesses and operations associated with restoring data to different parity stripes were performed sequentially.

DETAILED DESCRIPTION

Figure 1:
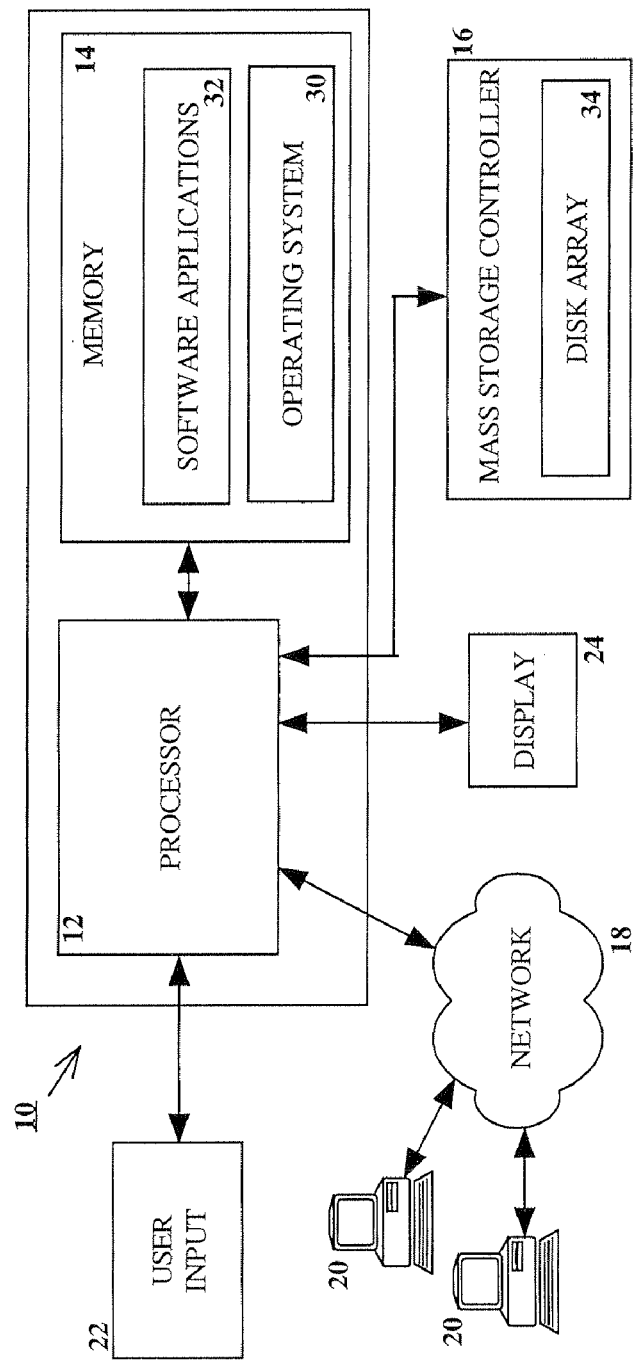
FIG. 1 is a block diagram of an exemplary computer system that can implement a RAID-6 storage controller in accordance with the principles of the present invention.

The embodiments discussed hereinafter utilize one or both of two techniques to increase parallelism and otherwise reduce the overhead associated with restoring data in a disk array environment such as a RAID-6 environment. One technique described hereinafter selects different subsets of disks to access in connection with an operation such as a rebuild or exposed read operation. Another technique described hereinafter overlaps read and write accesses associated with restoration operations performed with respect to multiple parity stripes.

Presented hereinafter are a number of embodiments of a disk array environment implementing the aforementioned techniques. However, prior to discussing such embodiments, a brief background on RAID-6 is provided, followed by a description of an exemplary hardware environment within which the aforementioned techniques may be implemented.

General RAID-6 Background

The nomenclature used herein to describe RAID-6 storage systems conforms to the most readily accepted standards for this field. In particular, there are N drives of which any two are considered to be the parity drives, P and Q. Using Galois Field arithmetic, two independent equations can be written:

$$\alpha^0 d_0 + \alpha^0 d_1 + \alpha^0 d_2 + \ldots + \alpha^0 d_{N-1} = 0 \quad (1)$$

$$\alpha^0 d_0 + \alpha^1 d_1 + \alpha^2 d_2 + \ldots + \alpha^{N-1} d_{N-1} = 0 \quad (2)$$

where the "+" operator used herein represents an Exclusive-OR (XOR) operation.

In these equations, ax is an element of the finite field and dx is data from the xth disk. While the P and Q disk can be any of the N disks for any particular stripe of data, they are often noted as dP and dQ. When data to one of the disks (i.e., dX) is updated, the above two equations resolve to:

$$\Delta = (\text{old } d_X) + (\text{new } d_X) \quad (3)$$

$$(\text{new } d_P) = (\text{old } d_P) + ((\alpha^Q + \alpha^X)/(\alpha^P + \alpha^Q))\Delta \quad (4)$$

$$(\text{new } d_Q) = (\text{old } d_Q) + ((\alpha^P + \alpha^X)/(\alpha^P + \alpha^Q))\Delta \quad (5)$$

In each of the last two equations the term to the right of the addition sign is a constant multiplied by the change in the data (i.e., $\Delta$). These terms in equations (4) and (5) are often denoted as K1 $\Delta$ and K2 $\Delta$, respectively.

In the case of one missing, or unavailable drive, simple XOR'ing can be used to recover the drive's data. For example, if d1 fails then d1 can be restored by:

$$d1 = d0 + d2 + d3 + \quad (6)$$

In the case of two drives failing, or being "exposed", the above equations can be used to restore a drive's data. For example, given drives 0 through X and assuming drives A and B have failed, the data for either drive can be restored from the remaining drives. If for example, drive A was to be restored, the above equations reduce to:

$$d_A = ((\alpha^B + \alpha^0)/(\alpha^B + \alpha^A))d_0 + ((\alpha^B + \alpha^1)/(\alpha^B + \alpha^A))d_1 + \ldots + ((\alpha^B + \alpha^X)/(\alpha^B + \alpha^A))d_X \quad (7)$$

Exemplary Hardware Environment

With this general background of RAID-6 in mind, attention can be turned to the drawings, wherein like numbers denote like parts throughout the several views. FIG. 1 illustrates an exemplary computer system in which a RAID-6, or other disk array, may be implemented. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on the disk array 34 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices accessed via a storage controller, or adapter, 16, e.g., removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

In accordance with the principles of the present invention, the mass storage controller 16 advantageously implements RAID-6 storage protection within an array of disks 34.

Computer 10 operates under the control of an operating system 30, and executes or otherwise relies upon various computer software applications, components, programs, objects, modules, data structures, etc. (e.g., software applications 32). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM=s, DVD=s, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
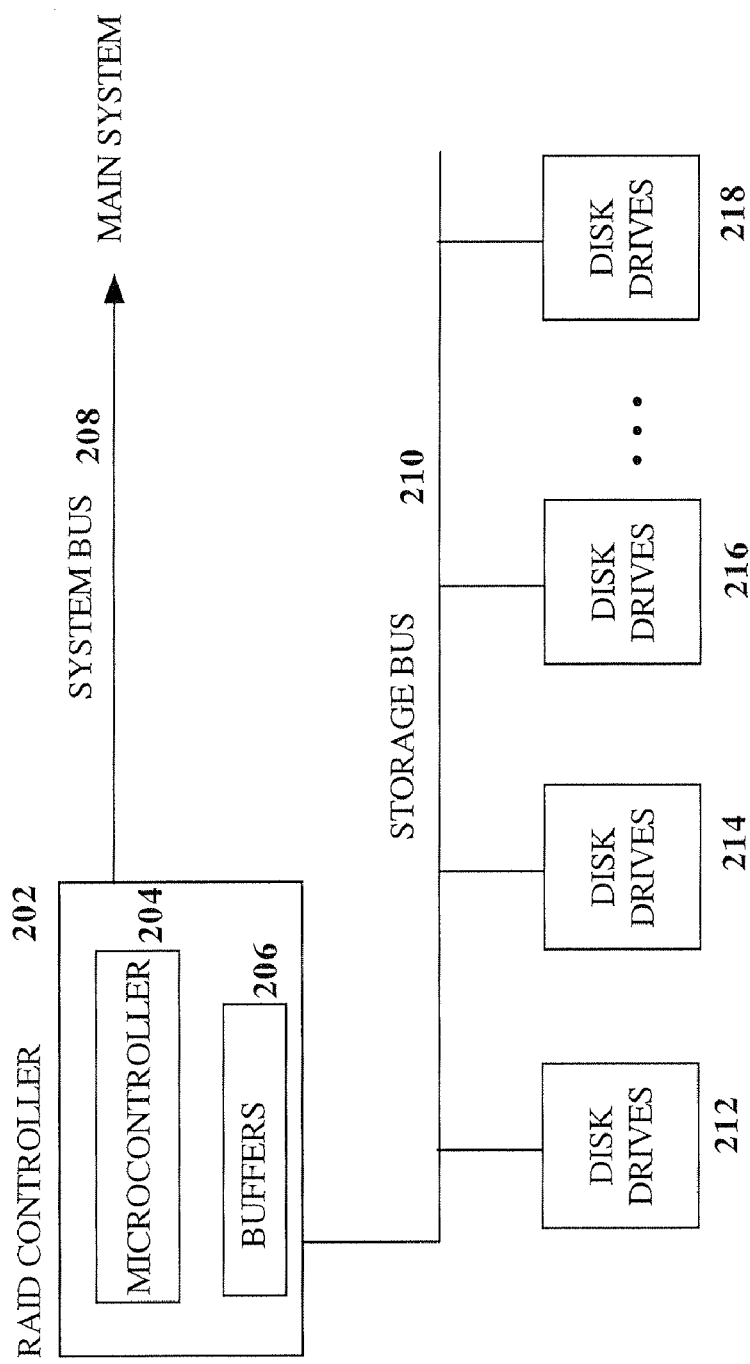
FIG. 2 is a block diagram illustrating the principal components of a RAID controller of FIG. 1.

FIG. 2 illustrates a block diagram of the control subsystem of a disk array system, e.g., a RAID-6 compatible system. In particular, the mass storage controller 16 of FIG. 1 is shown in more detail to include a RAID controller 202 that is coupled through a system bus 208 with the processor 12 and through a storage bus 210 to various disk drives 212-218. As known to one of ordinary skill, these buses may be proprietary in nature or conform to industry standards such as SCSI-1, SCSI-2, etc. The RAID controller includes a microcontroller 204 that executes program code that implements the RAID-6 algorithm for data protection, and that is typically resident in memory located in the RAID controller. In particular, data to be stored on the disks 212-218 is used to generate parity data and then broken apart and striped across the disks 212-218. The disk drives 212-218 can be individual disk drives that are directly coupled to the controller 202 through the bus 210 or may include their own disk drive adapters that permit a string a individual disk drives to be connected to the storage bus 210. In other words, a disk drive 212 may be physically implemented as 4 or 8 separate disk drives coupled to a single controller connected to the bus 210. As data is exchanged between the disk drives 212-218 and the RAID controller 202, in either direction, buffers 206 are provided to assist in the data transfers. The utilization of the buffers 206 can sometimes produce a bottle neck in data transfers and the inclusion of numerous buffers may increase cost, complexity and size of the RAID controller 202. Thus, certain embodiments of the present invention relate to provision and utilizing these buffers 206 in an economical and efficient manner.

It will be appreciated that the embodiment illustrated in FIGS. 1 and 2 is merely exemplary in nature. For example, it will be appreciated that the invention may be applicable to disk array environments other than RAID-6 environments. It will also be appreciated that a disk array environment consistent with the invention may utilize a completely software-implemented control algorithm resident in the main storage of the computer, or that some functions handled via program code in a computer or controller can be implemented in hardware logic circuits, and vice versa. Therefore, the invention should not be limited to the particular embodiments discussed herein.

Increasing Parallelism in RAID-6 Disk Accesses

In a RAID-6 system, when performing a restoration operation such as resyncing parity and data, rebuilding a disk, or performing an exposed mode read, a number of I/O operations on the different disks must be performed to read the available data, and if appropriate, store restored data back to the disk array. After reading the data for a particular parity stripe, the appropriate calculations may be performed to restore either the data on a disk or the parity information in the RAID array. Embodiments of the present invention include techniques for performing these operations in such a manner as to maximize the parallelism of the various I/O operations and to better balance disk utilization.

It has been found, for example, that improvements in performance may be obtained by selectively omitting accesses from disks in a disk array in connection with various restoration operations. As mentioned previously, RAID-6 is designed to handle two disk failures and, therefore, equation (7) above may be solved using data from N-2 disks. If two disks have failed, then the data for a disk, from equation (7), is recoverable using the remaining N-2 disks. Even when only one disk has failed, data for that disk is recoverable, in accordance with equation (7). Of note, however, it should be appreciated that in such a circumstance, the data from one of the disks may be omitted when solving the equation.

In RAID-5 implementations, any attempt to restore parity or data for a given disk (e.g., for resyncing parity and data, rebuilding the disk, or performing an exposed mode read) requires that all other disks in the array be accessed. Given, however, that RAID-6 implementations do not require the data from all other disks to solve a parity stripe equation, it has been found that a disk may not even need to be accessed in connection with solving such an equation. As a result, it may be desirable in embodiments consistent with the invention to omit an access to one or more disks in association with retrieving data used to solve a parity stripe equation, and thereby reduce the overall utilization of such disks.

Furthermore, while one particular disk could be omitted in all situations where a parity stripe equation needs to be solved, it is typically desirable to select different subsets of disks to omit when solving a parity stripe equation for different parity stripes, e.g., in connection with a restoration operation such as a disk rebuild or a series of exposed mode read operations. Therefore, instead of one disk consistently being unused during restoration operations, the determination of which disk to not use during a given restoration operation may be performed so as to better balance utilization levels among all of the disks.

Various manners of selecting different subsets of disks may be used consistent with the invention. In one embodiment, random selection may be used. In other embodiments, however, other load balancing-type algorithms may be used, e.g., round robin selection. It will be appreciated that the selection of different subsets does not require that each subset be different from every other subset, only that which disks are incorporated into the subsets used in solving parity stripe equations changes from time to time (e.g., for each parity stripe, or for subsets of parity stripes) such that the utilization of the disks in a disk array is better balanced than were the same disk(s) omitted for every parity stripe.

Additionally, it has also been found that improvements in performance may be obtained by overlapping disk accesses associated with multiple parity stripes in connection with various restoration operations. For example, when a parity stripe is resynchronized, the data drives are first read and then the result of the parity calculations is written to the parity drive. In conventional designs, during the time that the data drives are being read, the parity drives remain idle. During a rebuild, a similar underutilization of the disk(s) being rebuilt occurs as well. Embodiments consistent with the invention address this inefficiency by overlapping the read and write operations associated with restoring data to multiple parity stripes to reduce the idle time of the disks in a given disk array. In addition to RAID-6 and similar environments, overlapped disk accesses as described herein may also be used in other disk array environments, e.g., in RAID-5 environments.

Figure 3:
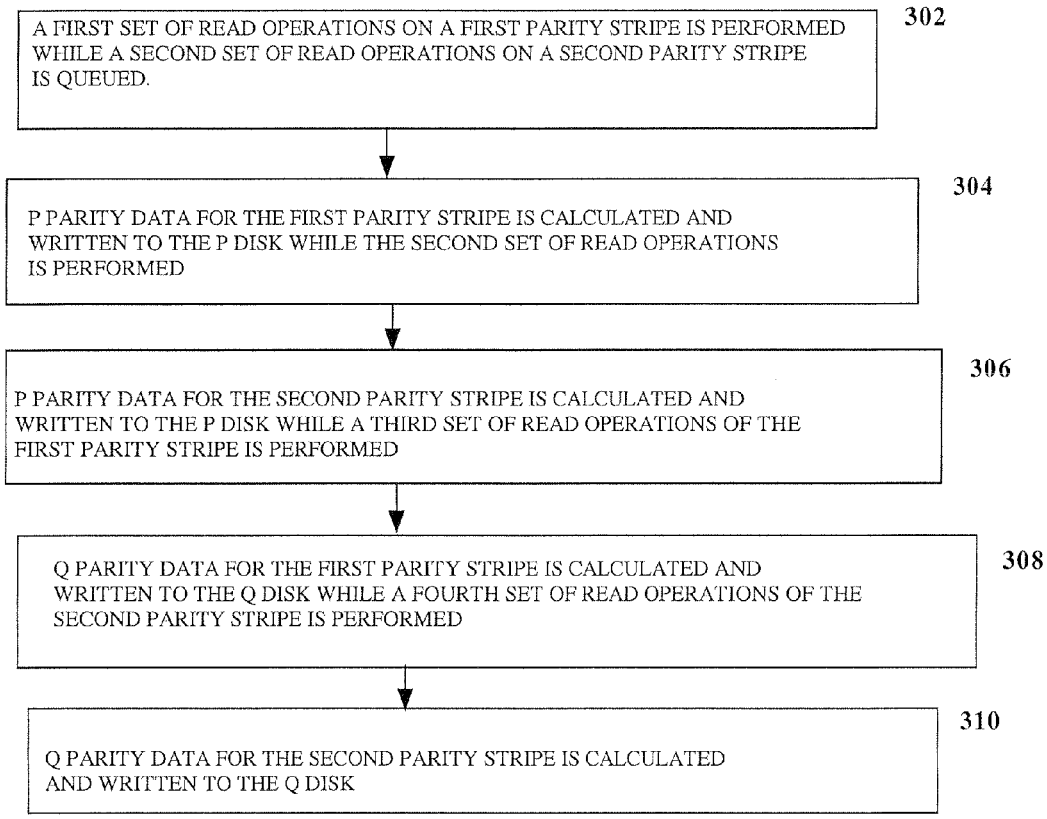
FIG. 3 depicts a flowchart for performing restoration operations in an overlapping manner to improve utilization of the disk array in a RAID-6 system in accordance with the principles of the present invention.

The flowchart of an exemplary method for accomplishing a restore operation (e.g., a resync or rebuild operation) is depicted in FIG. 3. In accordance with this method accesses for two different parity resync operations are interleaved so that accesses to both the parity and the data disks can occur in parallel and, therefore, reduce the overall idle time of the disks and improve the time it takes to perform rebuilds and resyncs. It will be appreciated that a rebuild operation for two or more parity stripes proceeds in a similar manner.

In the flowchart of FIG. 3, a set of data distributed across the data disks in a parity stripe A is used to calculate parity values P and Q for parity stripe A. Also, a set of data distributed across the data discs in a parity stripe B is used to calculate different parity values P and Q for parity stripe B. In step 302, a first set of read operations directed to the data disks, and specifically to the regions thereof located in parity stripe A is performed to retrieve a set of data used to calculate a corresponding parity value P for parity stripe A. Concurrently, a second set of read operations are queued that will retrieve a different set of data from the region allocated to parity stripe B on each of the data disks, which is used to calculate the corresponding parity value P for parity stripe B. Once the first set of read operations is complete, the new parity value P may be written to the P parity disk for parity stripe A, in step 304, while the second set of read operations are being executed by the other disks of the disk array. In step 306, a third set of read operations is performed—this time to retrieve the data from parity stripe A a second time to generate the parity value Q and, concurrently, the parity value P for parity stripe B is written to the P parity disk. Next, a fourth set of read operations is performed, in step 308, to read the set of data from parity stripe B, which is used to generate the parity value Q for parity stripe B. While these latter read operations are being performed the parity value Q is written to the Q parity disk for parity stripe A. Finally, in step 310, the parity value Q for parity stripe B is written to the Q parity disk.

By overlapping resync and rebuild operations in accordance with this algorithm, the parity drives and the data drives are more equally utilized which improves the performance of the resync and rebuild functions. One of ordinary skill in the art having the benefit of the instant disclosure will note that the aforementioned algorithm may be applied to overlap operations between any number of parity stripes.

Figure 4:
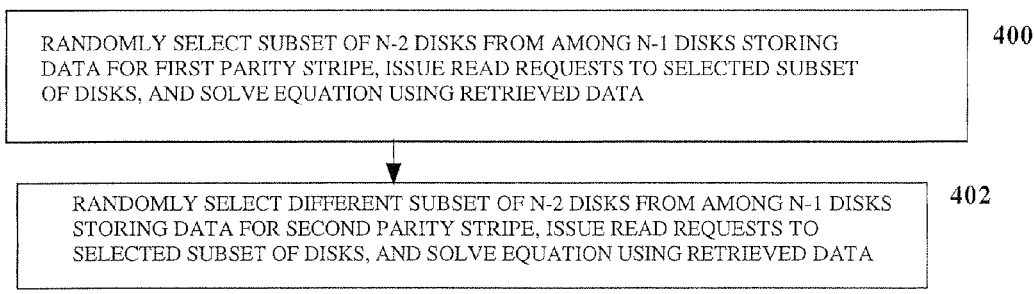
FIG. 4 depicts a flowchart for performing exposed mode read operations with random selection of which disks to access to improve utilization of the disk array in a RAID-6 system in accordance with the principles of the present invention.

FIG. 4 next illustrates an exemplary method for accomplishing an exposed read operation, e.g., to retrieve data from an exposed disk. In accordance with this method accesses for two exposed read operations to two parity stripes are illustrated, with one such access being performed in step 400, and another access being performed in step 402. In both operations, a different subset of N-2 disks is selected randomly from among the N-1 disks containing data from the parity stripe that can be used to solve the parity stripe equation and generate the data for the exposed disk. As a result, in each operation, one disk in the disk array will not be accessed, leaving the disk free to perform other operations (including, for example, handling overlapped accesses such as those described above in connection with FIG. 3). It will be appreciated that by randomly omitting different disks from a series of operations will assist in better balancing disk utilization across the disk array, and thus improve overall system throughput. It will also be appreciated that rebuild operations may utilize such a technique in a similar manner.

Thus, embodiments of the present invention provide a method and system, within a RAID-6 or similar disk array environment, that interleaves different disk access operations and/or selects different disks to be used while performing restore operations to balance disk utilization and decrease latency. Various modifications may be made to the illustrated embodiments without departing from the spirit and scope of the invention. Therefore, the invention lies in the claims hereinafter appended.

What is claimed is:

1. A computer implemented method of accessing a disk array comprising N disks, wherein N is greater than or equal to three, the method comprising the steps of, for each of a plurality of parity stripes defined in the disk array:
   selecting a different subset of disks among the N disks to be used to solve a parity stripe equation for such parity stripe, wherein each subset of disks includes at most N-2 disks, and wherein each subset includes at least one disk;
   initiating retrieval of data associated with such parity stripe only from the selected subset of disks;
   solving the parity stripe equation using the retrieved data; and
   initiating storage of a result of the parity stripe equation for a first parity stripe concurrently with initiating retrieval of data associated with a second parity stripe.

2. The computer implemented method of claim 1, wherein the step of selecting comprises the step of randomly selecting the subset of disks.

3. The computer implemented method of claim 1, wherein the disk array is of the type wherein the data in each parity stripe is related by multiple parity stripe equations.

4. The computer implemented method of claim 1, wherein the disk array comprises a RAID-6 (Redundant Array of Independent Disks-6) system.

5. The computer implemented method of claim 1, wherein solving the parity stripe equation comprises rebuilding a data value, the method further comprising initiating storage of the data value to one of the disks other than the subset of disks.

6. The computer implemented method of claim 1, wherein storing the result of the parity stripe equation for the first parity stripe is initiated in response to a parity resync operation and retrieval of data associated with the second parity stripe equation is initiated in response to a rebuild operation.

7. A computer implemented method of accessing a disk array comprising N disks, wherein N is greater than or equal to three, the method comprising the steps of, for each of a plurality of parity stripes defined in the disk array:
   selecting a different subset of disks among the N disks to be used to solve a parity stripe equation for such parity stripe, wherein each subset of disks includes at most N-2 disks, and wherein each subset includes at least one disk;
   initiating retrieval of data associated with such parity stripe only from the selected subset of disks; and
   solving the parity stripe equation using the retrieved data, wherein solving the parity stripe equation comprises performing an exposed mode read operation for an exposed disk, the exposed disk being one of the disks other than the subset of disks.

8. The computer implemented method of claim 7, further comprising concurrently performing an exposed mode read operation for a second exposed disk, the second exposed disk being another of the disks other than the subset of disks.

9. An apparatus comprising:
at least one processor;
a disk array comprising N disks, wherein N is greater than or equal to three; and
program code configured to be executed by the at least one processor to access the disk array, wherein the program code is configured to, for each of a plurality of parity stripes defined in the disk array, select a different subset of disks among the N disks to be used to solve a parity stripe equation for such parity stripe, initiate retrieval of data associated with such parity stripe only from the selected subset of disks, solve the parity stripe equation using the retrieved data, and initiate storage of a result of the parity stripe equation for a first parity stripe concurrently with initiating retrieval of data associated with a second parity stripe, wherein each subset of disks includes at most N-2 disks, and wherein each subset includes at least one disk.

10. The apparatus of claim 9, wherein the program code is configured to select the different subset of disks among the N disks by randomly selecting the subset of disks.

11. The apparatus of claim 9, wherein the disk array is of the type wherein the data in each parity stripe is related by multiple parity stripe equations.

12. The apparatus of claim 9, wherein the disk array comprises a RAID-6 (Redundant Array of Independent Disks-6) system.

13. The apparatus of claim 9, wherein the program code is configured to solve the parity stripe equation by rebuilding a data value and further configured to initiate storage of the data value to one of the disks other than the subset of disks.

14. The apparatus of claim 9, wherein the program code is configured to store the result of the parity stripe equation for the first parity stripe in response to a parity resync operation and retrieve data associated with the second parity stripe equation in response to a rebuild operation.

15. A program product, comprising:
a computer readable recordable type medium; and
program code configured upon execution to access a disk array comprising N disks, wherein N is greater than or equal to three, the program code stored on the computer readable recordable type medium, and configured upon execution to, for each of a plurality of parity stripes defined in the disk array, select a different subset of disks among the N disks to be used to solve a parity stripe equation for such parity stripe, initiate retrieval of data associated with such parity stripe only from the selected subset of disks, and solve the parity stripe equation using the retrieved data,
wherein each subset of disks includes at most N-2 disks,
wherein each subset includes at least one disk, and wherein the program code is configured to solve the parity stripe equation by performing an exposed mode read operation for an exposed disk, the exposed disk being one of the disks other than the subset of disks.

16. The program product of claim 15, wherein the program code is further configured to concurrently perform an exposed mode read operation for a second exposed disk, the second exposed disk being another of the disks other than the subset of disks.

* * * * *